Figure 1:
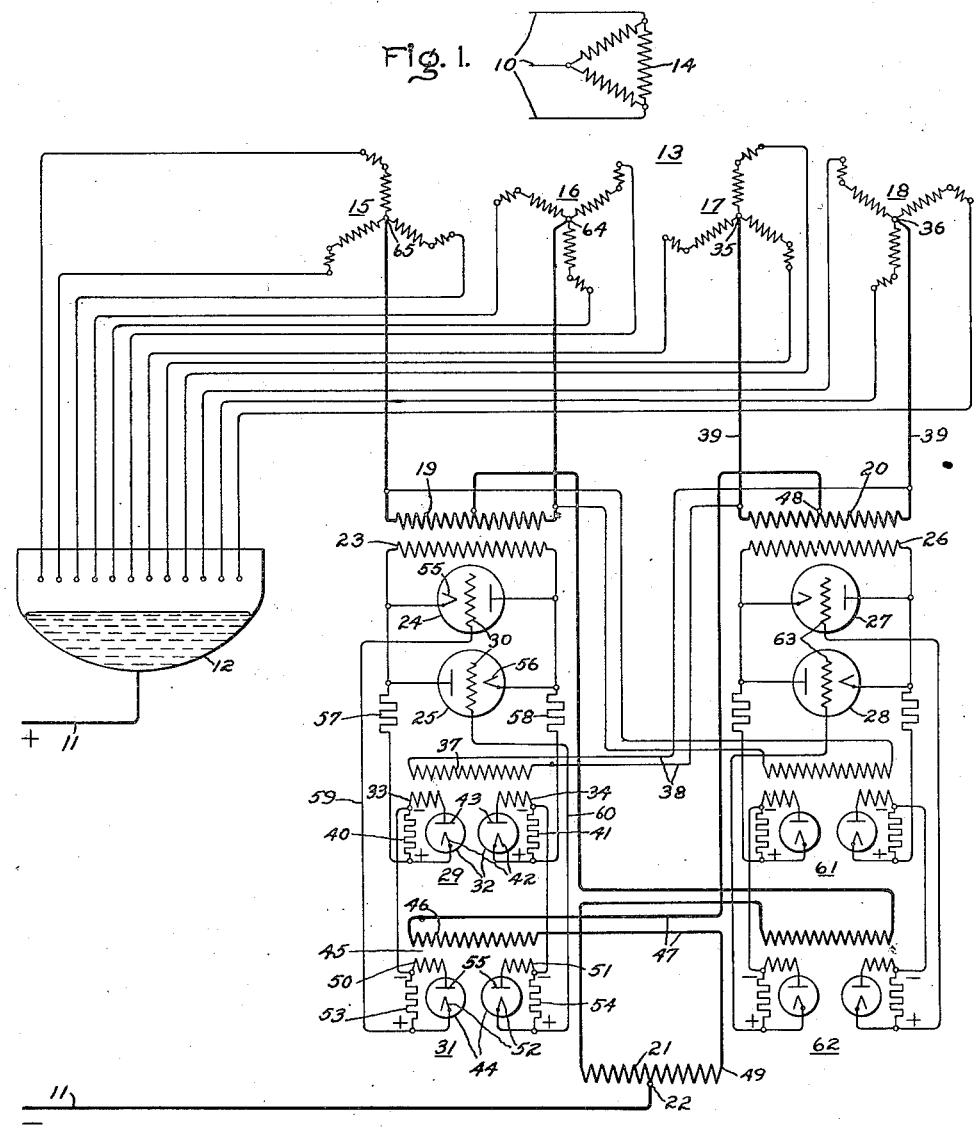

July 7, 1936.                    C. A. SABBAH                    2,046,972
                         COMPOUNDING SYSTEM FOR RECTIFIERS
                    Filed July 26, 1935          2 Sheets-Sheet 1

Inventor:
Camille A. Sabbah, Deceased
by William A. Dodge, Administrator
by Harry E. Dunham
Attorney.

July 7, 1936.  C. A. SABBAH  2,046,972
COMPOUNDING SYSTEM FOR RECTIFIERS
Filed July 26, 1935  2 Sheets-Sheet 2
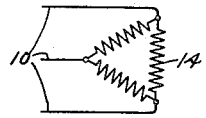
Fig. 2.
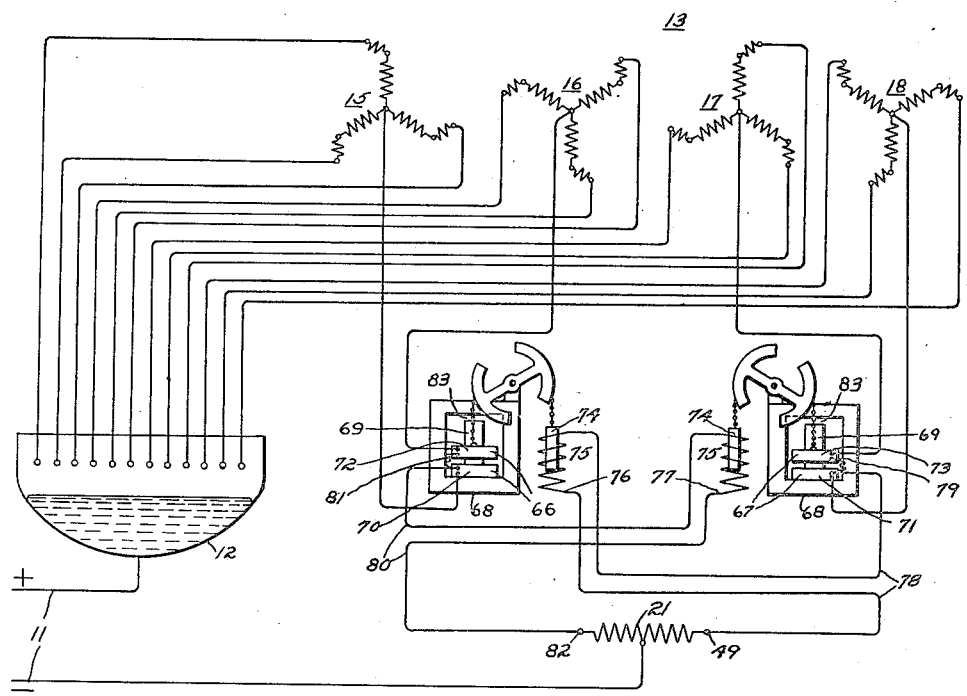
Fig. 3.
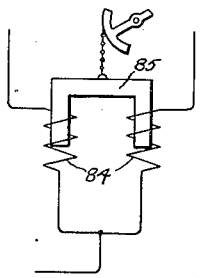
Fig. 4.
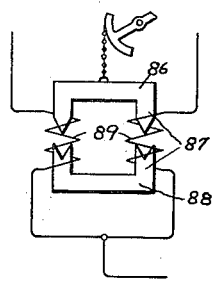
Inventor:
Camille A. Sabbah, Deceased
by William A. Dodge, Administrator
by Harry E. Dunham
Attorney.

Patented July 7, 1936

2,046,972

UNITED STATES PATENT OFFICE 2,046,972

COMPOUNDING SYSTEM FOR RECTIFIERS

Camille A. Sabbah, deceased, late of Schenectady, N. Y., by William A. Dodge, Schenectady, N. Y., administrator, assignor to General Electric Company, a corporation of New York Application July 26, 1935, Serial No. 33,216

7 Claims. (Cl. 175—363)

The present invention relates to electric systems wherein power is interchanged between direct and alternating current circuits through means comprising an electric discharge apparatus such as a mercury arc rectifier, particularly to means for providing compound operation of such systems, and has for its principal object the provision of an improved arrangement whereby the voltage of the direct current circuit may be maintained substantially independent of variation in the magnitude of the direct current load or may be made to vary in a predetermined manner as this load increases.

In Patent No. 1,783,804, a rectifying apparatus is disclosed wherein regulation of the direct current circuit is effected by means of an interphase connection including predetermined inductive and capacitive impedances so arranged as to produce an effective impedance which varies inversely as a direct current load. This interphase connection may include a reactor, an auxiliary transformer and a condenser arranged to produce such variation in the impedance of the transformer connection that the output voltage of the rectifier rises as the direct current load increases, the extent of this rise and the degree of compounding being determined by the constants of the interphase circuit connections.

It is sometimes desirable to utilize an interphase connection similar to the above to regulate the voltage of rectifiers or the like which are arranged for 12-phase operation. As is well understood by those skilled in the art, a 12-phase rectifying system may be made up of two 6-phase systems, each of which includes an interphase transformer. In the adaptation to such 12-phase systems of the above invention disclosed in the above-mentioned Patent No. 1,783,804, difficulty has been encountered due to the fact that the reactive voltage of the main transformer tends to cause unequal distribution of the load between the two interphase connections, one of the interphase connections being subjected to the larger load when the phase rotation of the main transformer is in one direction and the other interphase transformer connection having the larger load when the phase rotation of the main transformer is in the opposite direction.

In order to minimize or obviate this difficulty it has been proposed, as set forth in Patent No. 1,854,945, to provide an interconnection between the different interphase connections whereby it was intended that the effect of the reactive voltage generated in the main transformer windings should be neutralized and the unbalanced condition above mentioned corrected. However, even with the addition of the balancing means disclosed in the latter above mentioned Patent No. 1,854,945, considerable difficulties have been experienced when the attempt has been made to operate a rectifier, especially when fully compounded, embodying the above described compounding means. To overcome these difficulties, further corrective means have been provided, as disclosed in Patent 1,986,604 to C. A. Sabbah. In the cross-compounding arrangement disclosed in the latter patent, the output current of each 6-phase system controls the saturation of the reactor incorporated in the other 6-phase system, thereby counteracting the tendency to unbalance in the loads of the two 6-phase systems.

The methods of compounding in a quadruple Y rectifier, shown in the above cited Patents 1,783,804 and 1,854,945, involve arranging capacities in series with reactors which are varied by D. C. saturation to vary the commutating period between one 6-phase group and the other group. The reactors so used depart, however, from ordinary reactances in that the reactors allow more current to flow in one direction than another and, similarly, cause unequal peak voltages in the two groups. This action results in boosting the current in one group over the other, if depending on the degree of saturation or desaturation of the reactor in that group. This in turn results in saturating the third interphase transformer paralleling the two 6-phase groups, which process is cumulative and tends to maintain and to exaggerate the unbalance.

In accordance with the present invention, the unbalance difficulty is overcome by means whereby variable reactances for producing compounding effects are obtained which do not involve saturation.

In a preferred embodiment of the invention, means are provided for this purpose, preferably comprising grid controlled arc discharge devices connected to the terminals of secondary windings of the interphase transformers connecting the Y's of each 6-phase group, whereby the reactance of the interphase transformers is varied for different load conditions. When the arc discharge devices are conductive continuously, each 6-phase group operates as a 6-phase rectifier; when the arc discharge devices are not conductive at all, each 6-phase group operates as a double 3-phase system; when the arc discharge devices are conductive part of the time, each group provides a voltage intermediate between that provided by 6-phase operation and that provided by double 3-phase operation.

The period of conductivity of the arc discharge devices throughout the load range of the rectifier system is made proportional to the load current, the compounding thereby being accomplished in a continuous manner. This compounding is obtained by supplying the control grids of the arc discharge devices with a voltage consisting of three elements: (1) an alternating voltage having the same triangular wave shape as the voltage of the interphase transformer but shifted one fourth of its cycle out of phase with the latter voltage; (2) a negative D. C. voltage sufficient to prevent the starting of current through the arc discharge devices; (3) a positive D. C. voltage which varies with the load current, to cause the starting of current in the arc discharge devices.

In a modification of the invention, the reactance of the interphase transformers is varied in accordance with load conditions by arranging the interphase transformers as moving coil transformers in which one winding is moved with reference to the other winding to vary the reactance of the transformer without saturation of the core. In similar modifications, the same result is obtained by moving the core with reference to the windings, or by moving a section of the core to vary the air gap.

In order further to avoid possibility of unbalance due to saturation of reactances, the third interphase transformer, which parallels the two 6-phase groups, is preferably constructed with air gaps and with a high leakage reactance, so that this transformer can not well saturate throughout a desired load range.

To avoid unbalance between the two 6-phase systems due to the action of the reactive voltage of the main transformer, above mentioned in connection with Patent 1,783,804, in causing one or the other of the 6-phase connections to be subjected to the larger load depending on the phase rotation, the present invention includes a method of cross compounding somewhat similar to that disclosed in Sabbah Patent 1,986,604. However, instead of causing the output current of each 6-phase system to control the saturation of a reactor incorporated in the other 6-phase system as in the above-mentioned Sabbah Patent 1,986,604, in accordance with the present invention, the output current of each 6-phase group controls the reactance of the interphase transformer which connects the Y's of the other 6-phase group. Thus in the above-mentioned preferred embodiment of the invention, the output current of each 6-phase group controls the grid bias voltage of that one of the above mentioned arc discharge devices which is associated with the interphase transformer of the other 6-phase group, and in the above-mentioned modifications the output current of each 6-phase group controls the movement of the moving coil, or of the moving core of section of core, which effects the reactance variation of the interphase transformer of the other 6-phase group.

The present invention will be better understood by reference to the following description when considered in connection with the accompanying drawings and its scope will be pointed out in the appended claims.

Referring to the drawings, Fig. 1 is a diagrammatic representation of a rectifier system in which the present invention is embodied, Fig. 2 is a diagrammatic representation of a rectifier system embodying a modification of the invention wherein interphase transformer reactance is varied by a moving coil arrangement, and Figs. 3 and 4 illustrate diagrammatically arrangements wherein interphase transformer reactance is varied by the moving of core members.

In Fig. 1, the rectifier system includes alternating current supply terminals 10 and direct current terminals 11 between which power is transmitted through an electric discharge apparatus such as a rectifier 12 and a main transformer 13. The transformer 13 is provided with a primary winding 14 and with four sets of windings arranged to form four star-connected zig-zag wound secondary windings 15, 16, 17, and 18. The neutral terminals of the secondary windings 15 and 16 are interconnected through an interphase transformer 19, and the neutral terminals of the secondary windings 17 and 18 are likewise interconnected through an interphase transformer 20. Connected between the interphase transformers 19 and 20 is a winding 21, or third interphase transformer provided with a midterminal 22 which is connected to the negative side of the direct current circuit.

The interphase connections of the 6-phase system formed by the transformer windings 15 and 16 include the interphase transformer 19, a secondary winding 23 in inductive relation with winding 19, and means to short-circuit progressively the winding 23 comprising preferably a pair of arc discharge devices 24, 25 connected in full-wave relation with the terminals of winding 23. The interphase connections of the 6-phase system formed by the transformer windings 17, 18 similarly include the interphase transformer 20, a secondary winding 26, and short-circuiting means comprising a pair of arc discharge devices 27, 28.

To control the operation of the secondary short-circuiting devices or tubes 24, 25, a means preferably comprising a rectifier apparatus 29 is provided for impressing an alternating voltage on the control electrodes or grids 30 of the tubes 24, 25 and for impressing a negative D. C. bias voltage on these grids, and a means, which may comprise a second rectifier apparatus 31, is provided for impressing on the grids 30 of short circuiting tubes 24, 25 a positive D. C. voltage varying in accordance with load.

The rectifier apparatus 29 may comprise a pair of rectifier tubes 32 arranged to be supplied with voltage from secondary windings 33, 34 which are energized by voltage, preferably from the neutral terminals 35, 36 of Y's 17, 18 through a primary winding 37 connected to the neutrals 35, 36 through leads 38 and the connections 39 between neutrals 35, 36 and interphase transformer 20. The outer terminals of windings 33, 34 are connected respectively through negative bias resistors 40, 41 to the cathodes 42 of tubes 32, and the inner terminals of windings 33, 34 are connected to the anodes 43 of tubes 32.

The rectifier apparatus 31 may comprise a pair of rectifier tubes 44 arranged to be energized by a voltage, preferably from the output of the 6-phase rectifier group constituted by Y's 17, 18, either directly from an impedance in this latter output or by means of a transformer 45 having a primary 46 constituted by an output impedance connected, as by leads 47, between the neutral point 48 of interphase transformer 20 and the corresponding terminal 49 of the third, or paralleling, interphase transformer 21.

Transformer 45 includes two secondary windings 50, 51, the outer terminals of which are connected respectively to the cathodes 52 of tubes 44 through positive bias resistors 53, 54. The inner terminals of windings 50, 51 are connected to the anodes 55 of tubes 44.

To complete the connections whereby the desired potentials are impressed on grids 30 of short-circuiting tubes 24, 25, the negative bias resistors 40, 41 are connected at their negative terminals to the negative terminals of the positive bias resistors 53, 54 and are connected at their positive terminals respectively to the cathodes 55, 56 of short-circuiting tubes 24, 25, preferably through resistors 57, 58. The positive bias resistors 53, 54 are connected at their positive terminals through leads 59 and 60 to the grids 30 of tubes 24, 25 respectively.

To provide suitable grid voltage to the other pair of short-circuiting tubes 27, 28, means, such as a rectifier 61 corresponding to rectifier 29, and a rectifier 62 corresponding to rectifier 31, are provided, having connections to the grids 63 of tubes 27, 28 similar to the connections from rectifiers 29 and 31 to grids 30 of tubes 24, 25. Rectifier 61 may be supplied with voltage from the neutral terminals 64, 65 of the 6-phase group 15, 16, and rectifier 62 from an impedance in the output of this latter group, similarly to the supply of voltage to rectifiers 29 and 31 from the 6-phase group 17, 18.

In the operation of the system shown in Fig. 1, rectifiers 29 and 61 impress on the grids 30 and 63, of tubes 24, 25 and 27, 28, respectively, voltages of triple the frequency of the line voltage in transformer 13, which are 90° out of phase with the corresponding triple frequency voltages in interphase transformers 19 and 20 since the two 6-phase groups are 30° out of phase with each other and each of the rectifiers 29 and 61 is supplied from the opposite 6-phase group. A negative bias voltage, due to the voltage drop across the bias resistors in the outputs of rectifiers 29 and 61, is impressed on the grids 30 and 63 sufficient to prevent flow of current in tubes 24, 25 and 27, 28 in the absence of suitable positive bias voltage.

At low load the positive bias voltage on grids 30 and 63, due to the voltage drop across the resistors in the outputs of rectifiers 31 and 62, is small. Under these conditions the tubes 24, 25 and 27, 28 do not conduct current; interphase transformers 19 and 20 are not short-circuited and therefore function in the usual manner to cause the rectifier system as a whole to operate in quadruple 3-phase connection, each 6-phase group operating as a double 3-phase system.

As the load on the system rises, the positive bias voltage on grids 30 and 63 tends to rise correspondingly, thereby causing the tubes 24, 25 to be conductive for an increasing period of each cycle. Under this condition of rising load, the output voltage of each 6-phase group is intermediate that of double 3-phase operation and of 6-phase operation, and the output voltage of the entire system is intermediate that of quadruple 3-phase and double 6-phase operation. At full load the positive voltage on grids 30 and 63 tends to rise to such a value that the tubes 24, 25, and 27, 28 substantially short-circuit the interphase transformers 19, 20 thereby causing the system to operate double 6-phase.

Since the output current in each 6-phase group 15, 16 and 17, 18 controls the conductivity periods of the short-circuiting tubes of the other group, any tendency to unbalance in the loads of the two 6-phase groups is counteracted, an increase in the current output of one group above the current output of the other group tending to increase correspondingly the current in the short-circuiting tubes of the other group and thereby to increase the output voltage thereof sufficiently to equalize the outputs of the two groups.

Rectifier apparatus 29 and 61 are each shown herein as comprising two half-wave rectifiers. If desired, however, each secondary, for example, secondary 33 of rectifier apparatus 29, may be arranged to supply a full wave rectifier. In this case the secondary 33 is connected at its opposite terminals to cathode 55 and the corresponding grid of short-circuiting tube 24, means being arranged to provide a negative grid biasing voltage from a resistor connected in the output circuit of the full wave rectifier supplied by secondary 33. The other secondaries of rectifier apparatus 29 and 61 would in this case be arranged similarly, to supply voltages to the corresponding cathodes and grids of tubes 24 and 25. Rectifier apparatus 31 and 62 may also be arranged so that each secondary supplies a full wave rectifier. In this case, the grid leads of grids 30 and 63 would include a positive grid bias resistor connected in the output circuit of the full wave rectifier.

The bias voltage impressed on the grids 30 and 63 of the short-circuiting tubes 24, 25 and 27, 28 has been described as derived from the drop across resistors in circuits of rectifier devices. It will be understood, however, that any other suitable means may be employed for applying to grids 30 and 63, the required negative bias potential and a positive bias potential varying with load. For example, instead of deriving the positive bias potential from the rectifiers 31, 62 supplied from an impedance in the output of the 6-phase groups, this positive bias may be supplied from suitable D. C. voltage sources controlled by potentiometer or other means magnetically operated in accordance with the load current, such as plunger type solenoids energized by the load current.

The modification shown in Fig. 2 is similar to the system shown in Fig. 1 in including a 12-phase rectifier connected to a transformer provided with a 3-phase primary and with four star-connected secondaries arranged in two 6-phase groups. In Fig. 2, however, the interphase transformers 66, 67, corresponding respectively to the interphase transformers 19, 20 of Fig. 1, each form part of a moving coil apparatus which may, similarly to certain well known moving coil current regulators, comprise cores 68 having central legs 69 surrounded by fixed windings and movable windings. One section of each interphase transformer, as the sections 70 and 71 connected respectively to the Y's 15 and 18, forms one of the fixed coils, and the other section of each interphase transformer, i. e., sections 72 and 73 connected respectively to the Y's 16 and 17, forms one of the movable coils.

To reduce the reactance of the interphase transformers 66, 67 with rising load the counterbalance weights usual in moving coil current regulators are replaced by the moving elements 70 or plungers 74 of solenoids 75 the actuating coils 76, 77 of which are each energized preferably by the output of the opposite 6-phase system. Thus, solenoid coil 76 may be connected in the lead 78 connecting the midpoint 79 of interphase transformer 67 and the corresponding terminal 49 of third interphase transformer 21, and solenoid coil 77 may likewise be connected in lead 80 connecting midpoint 81 of interphase transformer 66 to the opposite terminal 82 of third interphase transformer 21. To prevent saturation of the interphase transformer cores 68, air gaps as 83 are preferably provided in the magnetic circuits.

In the operation of the modification shown in Fig. 2, at low load the reactance of the interphase transformers, with the movable coils 72, 73 in their lower position, is such that each 6-phase group operates as a double 3-phase system, the rectifier system as a whole operating in quadruple 3-phase connection. With increase of load, the increasing energizing current in coils 76, 77 of the solenoids 75 causes the interphase transformer movable coils 72, 73 to rise correspondingly thereby reducing the reactance, the output voltage of the system as the load rises being intermediate that of quadruple 3-phase and double 6-phase operation and at full load being that of double 6-phase.

Since the solenoids 75 are each energized from the opposite 6-phase group, any tendency to unbalance in the two 6-phase groups is counteracted.

In Fig. 3, the system will be understood to be essentially the same as above set forth in connection with Fig. 2 but instead of moving one of the sections of the interphase transformer windings 84 with reference to the other section, in Fig. 3 the reactance of the interphase transformer is varied by moving a core 85 with reference to windings of the transformer. The arrangement shown in Fig. 4 is similar to that of Fig. 3, except that in Fig. 4 a portion 86 of the core 87 is made movable with reference to the other portion 88 of the core and to the interphase transformer windings 89.

The present invention has been shown and illustrated herein as embodied in a 12-phase rectifier system comprising two 6-phase groups. It will be understood, however, that the invention is applicable to other rectifier systems than herein illustrated. It will be further understood that while the reactance control means have been described herein as applied to systems in which cross compounding is incorporated, the means described are not to be held limited to such use, but may be used in any rectifier system requiring compounding. Further in any system in which the reactance control means herein described are employed, the variation of reactance with load may be accomplished in accordance with load conditions in the same phase group to which the reactance control is applied, or in accordance with the total output of the entire system.

The present invention is shown and described with reference to an electric discharge apparatus of the vapor electric type and in which all of the anodes are enclosed in a single vessel. It will be understood, however, that the invention is not to be limited thereto, since any other suitable arrangement of electric discharge apparatus in which current is caused to flow unidirectionally between a negative conductor and a plurality of anodes, for rectifying or like purposes, may be employed.

While certain embodiments of the invention have been shown, it will be understood that many modifications may be made therein and that the appended claims are intended to cover any such modifications as fall within the true spirit and scope of the invention.

What is claimed as new and desired to secure by Letters Patent of the United States is:

1. The combination of two polyphase systems each provided with two sets of main transformer windings, each set having a neutral terminal, each of said polyphase systems being further provided with an interphase connection including an interphase transformer connected between the neutral terminals of the corresponding two sets of said windings, an electric discharge apparatus, direct current terminals connected to said interphase connections and through said apparatus to said windings, and means responsive to the current in each of said polyphase systems and operating directly on said interphase transformers to vary inversely as said current the reactance of the interphase transformer connected between the neutral terminals of the two sets of said windings of the other polyphase system.

2. The combination of two 6-phase systems each provided with two 3-phase main transformer windings and with an interphase connection including an interphase transformer connected between the neutral terminals of said windings, an electric discharge apparatus, direct current terminals connected to said interphase connections and through said discharge apparatus to said windings, and means responsive to the current in each of said 6-phase systems and operating directly on said interphase transformers to vary inversely as said current the reactance of the interphase transformer connected between the neutral terminals of the windings of the other 6-phase system.

3. In an electric system the combination of two sets of transformer windings provided with an interphase transformer connected therebetween, an electric discharge apparatus, direct current terminals connected to said interphase transformer and through said apparatus to said windings, and means to vary the reactance of said interphase transformer including a secondary winding in inductive relation with said transformer, an arc discharge apparatus connected to opposite terminals of said secondary winding, and means responsive to an electrical condition in said electric system to vary the conductivity of said arc discharge apparatus.

4. In an electric system, the combination of two sets of transformer windings provided with an interphase transformer connected therebetween, an electric discharge apparatus, direct current terminals connected to said interphase transformer and through said apparatus to said windings, and means to vary the reactance of said interphase transformer including a secondary winding in inductive relation with said transformer, an arc discharge apparatus connected to opposite terminals of said secondary winding having a grid, and means to vary the conductivity of said arc discharge apparatus comprising rectifier means to impress a varying negative voltage on said grid and a second rectifier means to impress on said grid a positive voltage varying with load in said electric system.

5. In an electric system, the combination of two polyphase systems, each provided with two sets of main transformer windings, each set having a neutral terminal, each of said polyphase systems being further provided with an interphase connection including an interphase transformer connected between the neutral terminals of the corresponding two sets of said windings, an electric discharge apparatus, direct current terminals connected to said interphase connections and through said apparatus to said windings, the interphase transformers of each of said polyphase systems having a secondary winding, each of said secondary windings having an arc discharge device connected thereacross adapted to short-circuit said secondary, and means to control the conductivity of a given one of said arc discharge devices, said means comprising rectifier means energized from said neutral terminals of the other of said polyphase systems to impress varying negative grid voltages on said one of said arc discharge devices, and a second rectifier means energized in accordance with the load in said other polyphase system to impress positive grid voltages on said one of said arc discharge devices.

6. In an electric system, the combination of two polyphase systems each provided with two sets of main transformer windings, each set having a neutral terminal, each of said polyphase systems being further provided with an interphase connection including an interphase transformer connected between the neutral terminals of the corresponding two sets of said windings, an electric discharge apparatus, direct current terminals connected to said interphase connections and through said apparatus to said windings, each of said interphase transformers having a fixed section and a section movable with respect thereto, and means responsive to the load in each of said polyphase systems to move the movable section of the interphase transformer corresponding to the other of said polyphase systems with respect to the corresponding fixed section.

7. In an electric system, the combination of two polyphase systems each provided with two sets of main transformer windings, each set having a neutral terminal, each of said polyphase systems being further provided with an interphase connection including an interphase transformer connected between the neutral terminals of the corresponding two sets of said windings, an electric discharge apparatus, direct current terminals connected to said interphase connections and through said connections to said windings, each of said interphase transformers including a core, and means responsive to the load in each of the polyphase systems to vary the position of at least a section of the core of the interphase transformer corresponding to the other of said polyphase systems with respect to the rest of said last-named interphase transformer.

WILLIAM A. DODGE,
*Administrator of the Estate of Camille A. Sabbah, Deceased.*